United States Patent [19]

Teske

[11] Patent Number: 4,921,089
[45] Date of Patent: * May 1, 1990

[54] TROUGH-TYPE CHAIN CONVEYOR FOR BULK MATERIAL

[76] Inventor: Lothar Teske, Hegelstrasse 15, D-5000 Köln, Fed. Rep. of Germany

[*] Notice: The portion of the term of this patent subsequent to Feb. 28, 2066 has been disclaimed.

[21] Appl. No.: 262,949

[22] Filed: Oct. 26, 1988

Related U.S. Application Data

[63] Continuation-in-part of Ser. No. 86,726, Aug. 17, 1987, Pat. No. 4,807,740.

[51] Int. Cl.$^5$ .............................................. B65G 47/19
[52] U.S. Cl. ................................... 198/534; 198/497; 198/561; 198/536
[58] Field of Search ............... 149/536, 561, 525, 720, 149/497, 499

[56] References Cited

U.S. PATENT DOCUMENTS

| | | | |
|---|---|---|---|
| 835,526 | 11/1906 | Horn | 198/497 |
| 924,332 | 6/1909 | Fleming | 198/525 X |
| 1,695,272 | 12/1928 | Christian et al. | 198/525 |
| 2,375,697 | 5/1945 | Sinden | 198/525 |
| 4,163,490 | 8/1979 | Timm | 198/525 X |
| 4,250,987 | 2/1981 | Trammell et al. | 198/561 X |
| 4,807,740 | 2/1989 | Teske | 198/561 X |

Primary Examiner—Robert J. Spar
Assistant Examiner—D. Glenn Dayoan
Attorney, Agent, or Firm—Herbert Dubno; Andrew Wilford

[57] ABSTRACT

A conveyor is used in combination with a supply of bulk material having an outlet of a predetermined relatively great transverse width to move the material from the outlet to an output location longitudinally and horizontally offset from the outlet in a transport direction. This conveyor has a trough itself having an intake of generally the large transverse width and opening upward at the outlet of the supply for receiving bulk material therefrom, a base extending in the direction, and a pair of side walls extending upward from the base and also extending in the direction. The side walls flare upward away from each other at least at the intake and have upper edges spaced transversely apart at the intake by the transverse width and lower edges spaced transversely apart generally along the full length of the trough by a relatively small transverse width. An endless conveyor chain carrying transversely projecting pushers has a lower stretch immediately juxtaposed in the trough with the base thereof and an upper stretch extending in the trough above the lower stretch and underneath the intake. The chain is driven to advance the lower stretch in the transport direction and move the material from the intake to the outlet and to advance the upper stretch opposite to this direction and break up the incoming bulk-material stream at the intake.

2 Claims, 1 Drawing Sheet

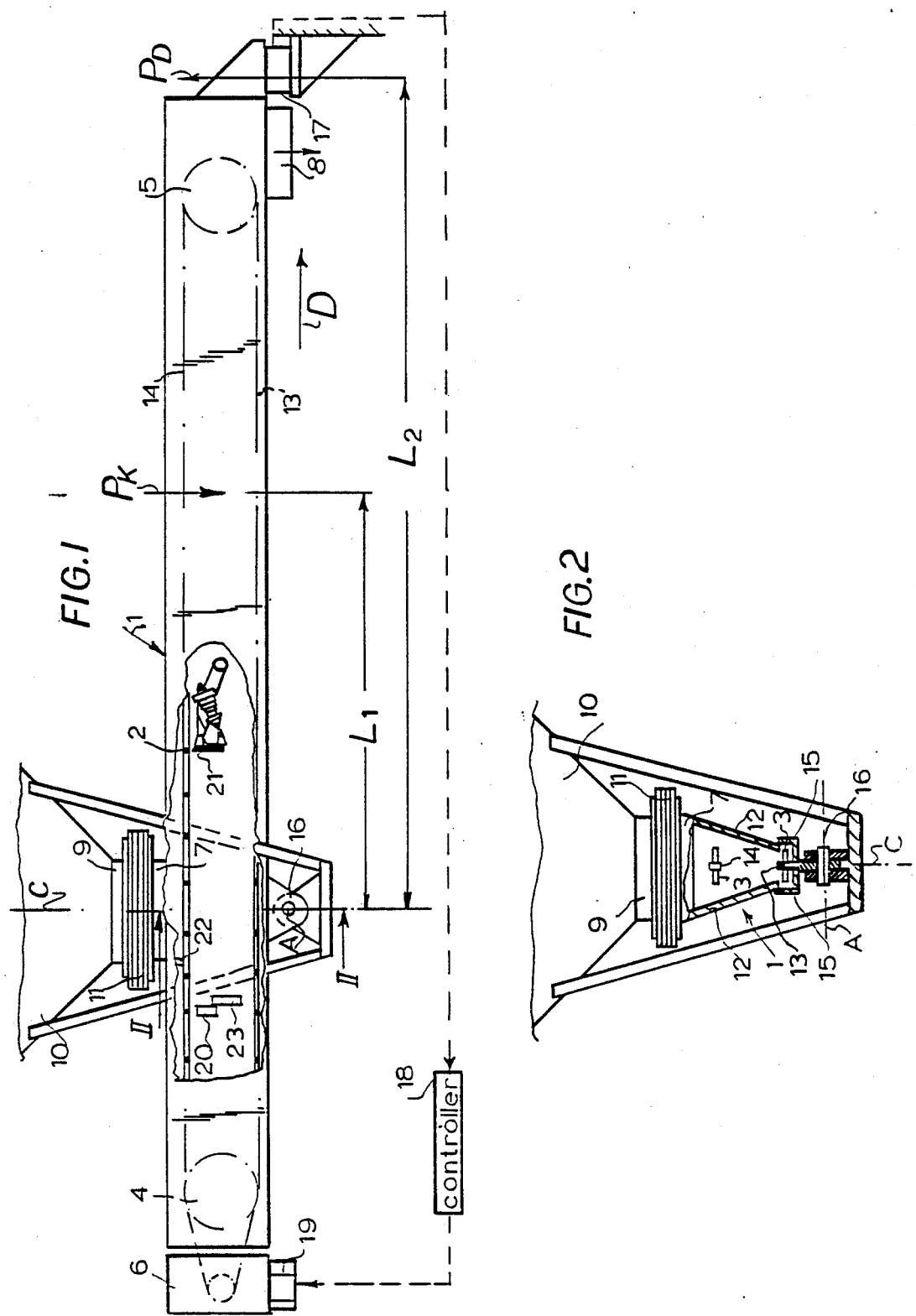

TROUGH-TYPE CHAIN CONVEYOR FOR BULK MATERIAL

CROSS-REFERENCE TO RELATED APPLICATION

This application is a continuation-in-part of copending patent application Ser. No. 086,726 filed 17 Aug. 1987 (now U.S. Pat. No. 4,807,740).

FIELD OF THE INVENTION

The present invention relates to a trough-type chain conveyor for bulk material. More particularly this invention concerns such a conveyor used to move gravel, ore, coal, or the like from a supply hopper or silo to an output location horizontally offset therefrom.

BACKGROUND OF THE INVENTION

A standard trough-type conveyor for bulk material has a trough having an intake of generally the same large transverse width as the outlet of the supply hopper or silo and opening upward underneath this outlet for receiving bulk material therefrom. In addition the trough has an output opening downward at the output location, a base extending in the direction, and a pair of side walls extending upward from the base and also extending in the direction. These side walls are normally vertical and spaced apart by the wide transverse dimension of the supply outlet so that material can fall unimpeded from the supply directly into the trough. An endless conveyor chain carrying transversely projecting pushers has an upper stretch immediately juxtaposed in the trough with the base thereof and a lower stretch extending beneath the trough. The chain is driven so its upper stretch advances in an upstream-to-downstream transport direction to move the material from the intake to the outlet of the trough.

As a result of the necessity of making the conveyor trough as wide as the supply outlet, to prevent arches from forming or the material from otherwise jamming at the intake, the entire machine is fairly bulky. This is particularly disadvantageous since such a conveyor is rarely if ever called upon to move the bulk material at a rate (volume or mass per unit of time) sufficiently great to actually need this large cross section. As a result such a conveyor is normally run at very low speed. This is very disadvantageous as it means that a large mass of the bulk material must be moved for what is often a very low throughput.

Another disadvantage of the known conveyors is that they are very difficult to accurately control. Determining just how much material is being moved and controlling it accurately is very difficult in view of the large mass being displaced and the low advance speed of the conveyor chain. Furthermore, a common problem with prior-art machines is that the upstream drive wheel can clog, necessitating expensive and time-consuming dismantling of the machine to clear the clog.

OBJECTS OF THE INVENTION

If is therefore an object of the present invention to provide an improved trough-type chain conveyor for bulk material.

Another object is the provision of such a trough-type chain conveyor for bulk material which overcomes the above-given disadvantages, that is which is compact, operates efficiently, and is easy to control.

A further object is to provide a conveyor of this type which does not clog at the upstream drive wheel.

SUMMARY OF THE INVENTION

The instant invention is used in combination with a supply of bulk material having an outlet of a predetermined relatively great transverse width to move the material from the outlet to an output location longitudinally and horizontally offset from the outlet in a transport direction. This conveyor has a trough itself having an intake of generally the large transverse width and opening upward underneath the outlet of the supply for receiving bulk material therefrom, an output opening downward at the output location, a base extending in the direction, and a pair of side walls extending upward from the base and also extending in the direction. An endless conveyor chain carrying transversely projecting pushers has a lower stretch immediately juxtaposed in the trough with the base thereof and an upper stretch extending in the trough above the lower stretch and underneath the intake. Thus a stream of bulk material passing out of the supply outlet and into the trough intake is longitudinally traversed by the upper stretch. The chain is driven to advance the lower stretch in the transport direction and move the material from the intake to the outlet and to advance the upper stretch opposite to this direction and break up the incoming bulk-material stream at the intake.

In order to prevent blockages according to a further feature of this invention a first scraper is provided vertically spaced by a first spacing above the upper stretch immediately upstream in the transport direction from the intake, a second scraper is provided vertically spaced by a second spacing below the upper stretch immediately upstream in the transport direction from the intake, a third scraper is provided vertically spaced by a third spacing above the lower stretch immediately upstream in the transport direction from the intake, and a fourth scraper is provided vertically spaced by a fourth spacing above the lower stretch immediately downstream in the transport direction from the intake. The first, third, and fourth spacings are increasingly large so that any material that gets past the first scraper will be able to get past the third one also, and similarly any material that gets past the third one will be able to get past the fourth one.

DESCRIPTION OF THE DRAWING

The above and other objects, features, and advantages will become more apparent from the following, reference being made to the accompanying drawing in which:

FIG. 1 is a partly diagrammatic and partly broken-away small-scale side view of the apparatus according to this invention; and FIG. 2 is a vertical cross section taken along line II—II of FIG. 1.

SPECIFIC DESCRIPTION

As seen in FIGS. 1 and 2 a bulk-material conveyor according to this invention has a horizontally elongated trough 1 in which is provided an endless conveyor chain 2 having crossbars 3 and spanned between an upstream drive sprocket 4 rotatable about a horizontal axis perpendicular to the trough 1 and a downstream idler sprocket 5 rotatable about a parallel axis. Adjacent its upstream (left-hand in FIG. 1) end the trough 1 has an upwardly open circular intake port 7 and at its extreme downstream end this trough 1 has a downwardly open outlet port 8 roughly under the sprocket 5. A motor 6 at the upstream end of the trough 1 powers the sprocket 4.

The intake port 7 is directly aligned under the substantially identically shaped lower output end 9 of a silo 10 containing bulk material, with a cuff 11 interconnecting the two and allowing some relative movement. As best seen in FIG. 2 the trough 1 has side walls 12 that are inclined at least at the intake 7 upward away from each other, symmetrically relative to a centerline or axis C of the port 7 and outlet 9. Thus at their upper edges 12 the spacing of the two sides 12 is about equal to the diameter of the intake 7 but at their lower edges they are much more closely spaced.

The chain 2 has a lower stretch 13 that runs along the bottom of the trough 15, with the ends of the pusher bars 3 of this lower stretch 12 received in horizontally confronting insets or grooves 15 extending along the lower edge of the trough 1. In addition the chain 2 has an upper stretch 14 which runs normally above the bulk material in the trough 1 except at the intake 7 where it runs right through the descending stream of this bulk material. Thus there will be no possibility of blockage at this intake 7 in spite of the fact that the conveyor has an effective width that is here less than half of the crosswise dimension of its intake port 7 since the stream of material entering will be broken up and stirred by the upper stretch 14 as it moves counter to the left-to-right transport direction D of the system.

The entire trough 1 can rock about a horizontal axis A defined by a horizontal pivot 16 suspended from the hopper 10 and lying directly under the trough 1 on the centerline C of the intake 7. The downstream end of the trough 1 is supported via a pressure-detecting strain gauge 17 on a fixed point. This gauge 17 is connected via an electronic controller 18 to a pulse-type speed controller 19 that itself operates the drive motor 6 for the system.

Thus it is possible for the controller 18 to accurately monitor and change the output in units of mass relative to units of time. The downward force $P_1$ exerted by the bulk material in the trough 1 at a centerpoint downstream of the centerline C by a distance $L_1$ can easily be calculated from the force $P_D$ exerted at the gauge 17, taking into account of course the longer distance $L_2$ this gauge 17 is downstream of the centerline C. The controller 18 knows and can control the advance rate of the chain 2 by means of the speed regulator 19 so as to establish virtually any desired output rate.

In order to ensure finer control the trough 1 is provided upstream of the port 7 with a first scraper 22 which is spaced a very short distance $S_1$ above the upper stretch 14 and immediately upstream therefrom a second scraper 20 engaging under the upper stretch 14. In addition roughly underneath the scraper 23 is a third scraper spaced above the lower stretch 13 by a spacing $S_3$ which is somewhat greater than the spacing $S_1$. Thus any material that gets past the scraper 22 will be able to get past the scraper 23 also. Finally, downstream of the port 7 is another vertically adjustable scraper 21 spaced a fourth distance $S_4$ above the lower stretch 13, and once again this fourth spacing $S_4$ is substantially greater than the spacing $S_3$ which, as mentioned, is itself greater than the spacing $S_1$.

As a result of these cascaded scrapers 22, 23, 21 it is virtually impossible for bulk material to build up and jam at the drive wheel 4. Any material escaping the first scraper 22 will be able to go under the scraper 23, and any material coming under it will surely be able to get under the last scraper 21. In addition the difference in height between the spacings $S_3$ and $S_4$ accounts for the volume of material that flows downstream from the input location.

Thus with the system of this invention the relatively slim trough 1 can transport bulk material from a wide-mouth supply with no likelihood of jamming or clogging. In addition the system can easily monitor and control the throughput rate while operating very efficiently.

I claim:

1. In combination with a supply of bulk material having an outlet of a predetermined relatively great transverse width, a conveyor for moving the material from the outlet to an output location longitudinally and horizontally offset from the outlet in a transport direction, the conveyor comprising:

a trough having
   an intake of generally the large transverse width and opening upward underneath the outlet of the supply for receiving bulk material therefrom,
   an output opening downward at the output location,
   a base extending in the direction, and a pair of side walls extending upward from the base and also extending in the direction, the side walls flaring upward away from each other at least at the intake and having upper edges spaced transversely apart at least at the intake by the transverse width and having lower edges spaced transversely apart generally along the full length of the trough by a relatively small transverse width;

an endless conveyor chain carrying transversely projecting pushers and having a lower stretch immediately juxtaposed in the through with the base thereof and an upper stretch extending in the trough above the lower stretch and underneath the intake, whereby a stream of bulk material passing out of the supply outlet and into the trough intake is longitudinally traversed by the upper stretch;

means for driving the chain and thereby advancing the lower stretch in the transport direction to move the material from the intake to the outlet and to advance the upper stretch opposite to this direction and break up the incoming bulk-material stream at the intake; and a first scraper vertically spaced by a first spacing above the upper stretch immediately upstream in the transport direction from the intake;

a second scraper
vertically spaced by a second spacing below the upper stretch and
engaging upward against the upper stretch immediately upstream in the transport direction from the intake;

a third scraper vertically spaced by a third spacing above the lower stretch immediately upstream in the transport direction from the intake; and a fourth scraper vertically spaced by a fourth spacing above the lower stretch immediately downstream in the transport direction from the intake, the fourth and third spacings being respecitvely greater than the second and first spacings.

2. The bulk-material conveyor defined in claim 1 wherein the side walls form adjacent the base horizontally confronting and longitudinally extending grooves in which the pushers engage and slide.

* * * * *